US006646032B2

(12) United States Patent
Jang et al.

(10) Patent No.: US 6,646,032 B2
(45) Date of Patent: Nov. 11, 2003

(54) THERMOPLASTIC FLAMEPROOF RESIN COMPOSITION

(75) Inventors: Bok-nam Jang, Seoul (KR); Se-jong Kim, Kyungki-do (KR); Gyu-cheol Lee, Kyungki-do (KR); Young-kil Chang, Seoul (KR); Byeong-do Lee, Cheonnam (KR); Jung-hyun Kim, Seoul (KR)

(73) Assignee: Cheil Industries Inc., Kyungbuk (KR)

( * ) Notice: Subject to any disclaimer, the term of this patent is extended or adjusted under 35 U.S.C. 154(b) by 0 days.

(21) Appl. No.: 10/011,056

(22) Filed: Dec. 6, 2001

(65) Prior Publication Data
US 2002/0065343 A1 May 30, 2002

Related U.S. Application Data

(63) Continuation of application No. 09/233,415, filed on Jan. 19, 1999, now abandoned.

(30) Foreign Application Priority Data

Sep. 2, 1998 (KR) ............................................. 98-36004

(51) Int. Cl.$^7$ ................................................. C08K 5/52
(52) U.S. Cl. ..................... 524/127; 524/141; 524/145
(58) Field of Search ............................... 524/127, 141, 524/145

(56) References Cited

U.S. PATENT DOCUMENTS

| | | | |
|---|---|---|---|
| 4,360,618 A | 11/1982 | Trementozzi | 524/141 |
| 4,433,088 A | 2/1984 | Haaf et al. | 524/153 |
| 4,578,423 A | 3/1986 | Deets et al. | 525/68 |
| 4,618,633 A | 10/1986 | Taubitz et al. | 524/80 |
| 4,835,201 A | 5/1989 | Bopp | 524/102 |
| 4,866,126 A | 9/1989 | Mylonakis et al. | 525/68 |
| 4,966,814 A | 10/1990 | Ohzeki | 428/457 |
| 5,100,959 A | 3/1992 | Okada et al. | 525/68 |
| 5,143,955 A | 9/1992 | Kendall et al. | 524/151 |
| 5,206,404 A | 4/1993 | Gunkel et al. | 558/146 |
| 5,290,836 A | 3/1994 | Truyen | 524/127 |
| 5,455,292 A | 10/1995 | Kakegawa et al. | 524/141 |
| 5,605,962 A * | 2/1997 | Suzuki et al. | 525/134 |
| 5,621,029 A | 4/1997 | Eckel et al. | 524/127 |
| 5,643,981 A | 7/1997 | Yang et al. | 524/141 |
| 5,672,645 A | 9/1997 | Eckel et al. | 524/127 |
| 5,674,924 A | 10/1997 | Lee et al. | 523/201 |
| 6,124,385 A | 9/2000 | Honl et al. | 524/115 |
| 6,451,889 B1 | 9/2002 | Jang et al. | 524/127 |

FOREIGN PATENT DOCUMENTS

| | | | |
|---|---|---|---|
| JP | 60-063251 A | 4/1985 | ............ 524/127 |
| JP | 7-48491 | 2/1995 | |

OTHER PUBLICATIONS

Costa et al., "Flame–Retardant Properties of Phenol–Formaldehyde–Type Resins and Triphenyl Phosphate in Styrene-Acrylonitrile Copolymers", *Journal of Applied Polymer Science*, vol. 68, p. 1067 (1998).

* cited by examiner

Primary Examiner—Cephia D. Toomer
(74) Attorney, Agent, or Firm—Maria Parrish Tungol

(57) ABSTRACT

A flameproof thermoplastic resin composition of the present invention comprises (A) a base resin comprising 40 to 95% by weight of a rubber modified styrene-containing resin ($a_1$) composed of 20 to 100% by weight of a styrene-containing graft copolymer resin ($a_{11}$) and 0 to 80% by weight of a styrene-containing copolymer resin ($a_{12}$), and 60 to 5% by weight of polyphenylene ether resin ($a_2$); (B) 2 to 40 parts by weight of a styrene-acrylonitrile copolymer containing 5 to 18% by weight of acrylonitrile per 100 parts by weight of the base resin; (C) 5 to 30 parts by weight of an aromatic phosphoric acid ester compound having a melting point of more than 90° C. per 100 parts by weight of the base resin; and (D) 3 to 30 parts by weight of a phenolic resin per 100 parts by weight of the base resin. The flameproof thermoplastic resin composition may further comprise 0 to 30 parts by weight of an anti-dripping agent, an impact modifier, a plasticizer, a heat stabilizer, an oxidation inhibitor, a light stabilizer, a compatibilizer, pigments, dyes and/or inorganic fillers on the basis of 100 parts by weight of the base resin.

26 Claims, No Drawings

THERMOPLASTIC FLAMEPROOF RESIN COMPOSITION

This application is a continuation of Ser. No. 09/233,415 filed on Jan. 19, 1999, now abandoned.

FIELD OF THE INVENTION

The present invention relates to a flameproof thermoplastic resin composition. More particularly, the present invention relates to a flameproof thermoplastic resin composition that comprises a rubber modified styrene-containing resin and a polyphenylene ether resin as a base resin, a styrene-acrylonitrile copolymer containing from 5 to 18% by weight of acrylonitrile as a compatibilizer, an aromatic phosphoric acid ester compound with a melting point of above 90° C. as a main flame retardant, and a phenolic resin as a further flame retardant.

BACKGROUND OF THE INVENTION

A rubber modified styrene-containing resin has a good processability, a high impact strength, and a good appearance. Accordingly, the resin has been widely applied to electric appliances and office supplies. In case that a rubber modified styrene-containing resin is applied to personal computers, facsimiles, and the like, which emit heat, flame-retardant property should be given to the resin due to a combustibility. A widely known method for the flame retardancy is that halogen-containing compounds or antimony-containing compounds are added to a rubber modified styrene-containing resin to give flame-retardant property. The halogen-containing compounds used in above method are, for example, polybromodiphenyl ether, tetrabromobisphenol A, epoxy compounds substituted by bromine, chlorinated polyethylene, etc. An antimony trioxide and an antimony pentaoxide are commonly used as antimony-containing compounds.

The methods for improvement of flame-retardant property by applying halogen- and antimony-containing compound have advantages such as easy acquirement of the flame-retardant property and no degradation of the physical properties. However, the disadvantages could be observed that the halogen-containing compound results in the corrosion of the mold itself by the hydrogen halide gases released during the molding process and is fatally harmful due to the toxic gases liberated in case of fire. Especially, since a polybromodiphenyl ether, mainly used for a halogen-containing flame retardant, can produce toxic gases such as dioxin or furan during combustion, flame retardants which are not prepared with halogen-containing compound have become main concerns in this field.

It is commonly known a method to apply phosphorus or nitrogen compounds as halogen-free flame retardant to a resin composition. However, usage of only phosphorus compound deteriorates heat resistance of a rubber modified styrene-containing resin and does not impart sufficient flame retardancy.

Generally, when a rubber modified styrene-containing resin such as ABS is burned, a char is not produced due to decomposition and vaporization in most parts (*Journal of Applied Polymer Science*, 1998, vol 68, p1067). Therefore, to impart an effect of flame retardancy, it is necessary to add a char-forming agent to a resin composition, which plays a role to prohibit entrance of oxygen and emission of fuel by forming char on the surface of rubber with three-dimensional carbon chain bonds under combustion.

Japanese Patent Laid-open No. 7-48491 discloses a flameproof thermoplastic resin, made of adding a novolac phenolic resin and a phosphoric acid ester into a thermoplastic copolymer resin composed of a rubber copolymer and an aromatic vinyl monomer. It was found that in order to obtain a good property of flame retardancy, a phenolic resin as a char-forming agent and a phosphoric acid ester compound as a flame retardant should be added in a lot of amount. However, in this case, the heat resistance of the resin composition is dropped suddenly.

The present inventors have made it possible to prepare a flameproof resin composition by mixing a styrene-acrylonitrile copolymer having from 5 to 18% by weight of acrylonitrile as a compatibilizer, an aromatic phosphoric acid ester compound as a main flame-retardant and a phenolic resin as a further flame-retardant to improve flame-retardant property of a resin composition and adding the mixture to a base resin comprising a rubber-modified styrene-containing resin and a polyphenylene ether resin. Therefore, good mechanical properties as well as a good improvement of flame retardancy and heat resistance have been obtained.

OBJECTS OF THE INVENTION

An object of the present invention is to provide a thermoplastic resin composition which has a good property of flame retardancy.

Another object of the present invention is to provide a flameproof thermoplastic resin composition which has a good characteristic of heat resistance.

A further object of the present invention is to provide a flameproof thermoplastic resin composition which has good mechanical properties.

A further object of the present invention is to provide a flameproof thermoplastic resin composition which does not contain halogen-containing compounds which causes the environmental pollution during the preparation or combustion of the resin.

Other objects and advantages of this invention will be apparent from the ensuing disclosure and appended claims.

SUMMARY OF THE INVENTION

A flameproof thermoplastic resin composition of the present invention comprises (A) a base resin comprising 40 to 95% by weight of a rubber modified styrene-containing resin ($a_1$) composed of 20 to 100% by weight of a styrene-containing graft copolymer resin ($a_{11}$) and 0 to 80% by weight of a styrene-containing copolymer resin ($a_{12}$), and 60 to 5% by weight of polyphenylene ether resin ($a_2$); (B) 2 to 40 parts by weight of a styrene-acrylonitrile copolymer containing 5 to 18% by weight of acrylonitrile per 100 parts by weight of the base resin; (C) 5 to 30 parts by weight of an aromatic phosphoric acid ester compound having a melting point of more than 90° C. per 100 parts by weight of the base resin; and (D) 3 to 30 parts by weight of a phenolic resin per 100 parts by weight of the base resin. The flameproof thermoplastic resin composition may further comprise 0 to 30 parts by weight of an anti-dripping agent, an impact modifier, a plasticizer, a heat stabilizer, an oxidation inhibitor, a light stabilizer, a compatibilizer, pigments, dyes and/or inorganic fillers on the basis of 100 parts by weight of the base resin.

DETAILED DESCRIPTION OF THE INVENTION

The flameproof thermoplastic resin composition according to the present invention comprises (A) a base resin comprising ($a_1$) a rubber modified styrene-containing resin composed of ($a_{11}$) a styrene-containing graft copolymer resin and ($a_{12}$) a styrene-containing copolymer resin, and ($a_2$) a polyphenylene ether resin, (B) a styrene-acrylonitrile copolymer containing 5 to 18% by weight of acrylonitrile, (C) an aromatic phosphoric acid ester compound, and (D) a phenolic resin.

The detailed descriptions of components of the resin composition according to the present invention are as follows:

(A) Base Resin

A base resin according to present invention is composed of 40 to 95% by weight of a rubber modified styrene-containing resin ($a_1$) and 60 to 5% by weight of a polyphenylene ether resin ($a_2$). Preferably, a rubber modified styrene-containing resin ($a_1$) is 60 to 95% by weight and a polyphenylene ether resin ($a_2$) is 40 to 5% by weight. More preferably, a rubber modified styrene-containing resin ($a_1$) is 70 to 95% by weight and a polyphenylene ether resin ($a_2$) is 30 to 5% by weight.

($a_1$) Rubber modified styrene-containing resin

A rubber modified styrene-containing resin means that a styrene-containing graft copolymer resin such as ABS, and the graft copolymer resin may contain a styrene-containing copolymer resin such as SAN.

In the rubber modified styrene-containing resin which is prepared of aromatic vinyl copolymers, rubber phase copolymers are dispersed in the form of particles in a matrix. The resin is prepared by mixing an aromatic vinyl monomer and a vinyl-containing monomer, which can be polymerized therewith, in the presence of a rubber phase polymer. Such rubber-modified styrene-containing resin is prepared by a known method such as emulsion polymerization, suspension polymerization or bulk polymerization, and is conventionally produced by an extrusion with a styrene-containing graft copolymer resin and a styrene-containing copolymer resin. In a bulk polymerization, both a styrene-containing graft copolymer resin and a styrene-containing copolymer resin are prepared together in one process. In other words, one step process is employed to produce a rubber modified styrene-containing resin. In other polymerizations, a styrene-containing graft copolymer resin and a styrene-containing copolymer resin may be prepared separately. In either case, the contents of rubber in a final rubber modified styrene-containing resin to the total weight of the base resin are preferably in 5 to 30 parts by weight. Examples of such resins are acrylonitrile-butadiene-styrene (ABS) copolymer resin, acrylonitrile-acryl rubber-styrene (AAS) copolymer resin, acrylonitrile-ethylenepropylene rubber-styrene (AES) copolymer resin, and the like.

In this invention, a styrene-containing graft copolymer resin can be used alone or in combination with a styrene-containing copolymer resin.

($a_{11}$) Styrene-containing graft copolymer resin

Examples of a rubber used for a styrene-containing graft copolymer resin are a diene-containing rubber such as polybutadiene, poly(styrene-butadiene) and poly (acrylonitrile-butadiene); a saturated rubber in which hydrogen is added to said diene-containing rubber; an isoprene rubber; a chloroprene rubber; a polyacrylic acid butyl; and a terpolymer of ethylene-propylene-diene. It is preferable to use a diene-containing rubber, more preferably a butadiene-containing rubber. The content of rubber is preferably in the range of 10 to 60 parts by weight based on the total weight of a graft copolymer resin.

Aromatic vinyl-containing monomers for use preparing the graft copolymer are styrene, α-methylstyrene, p-methylstyrene, etc. In the above examples, styrene is most preferable. At least one copolymerizable monomer may be introduced and applied to said aromatic vinyl monomers. It is preferred that said copolymerizable monomers are a cyanide vinyl-containing compound such as acrylonitrile and an unsaturated nitrile-containing compound such as methacrylonitrile.

The rubber content of the styrene-containing graft copolymer is 10 to 60 parts by weight, the aromatic vinyl-containing monomer content therein is 30 to 70 parts by weight, and the unsaturated nitrile-containing monomer content therein is 10 to 30 parts by weight. In addition, in order to give good characteristics of processability and heat resistance, the monomers such as acrylic acid, methacryl acid, maleic anhydride and N-substituted maleimide can be added in the graft polymerization. The amounts of the monomers are in the range of 0 to 20 parts by weight based on the total of said styrene-containing graft copolymer resin.

To acquire good impact strength and appearance when said styrene-containing graft copolymer is prepared, the average size of rubber particles is preferred to be in the range of from 0.1 to 4 $\mu$gm.

($a_{12}$) Styrene-containing copolymer resin

The styrene-containing copolymer resin according to the present invention is prepared by copolymerizing an aromatic vinyl-containing monomer and other copolymerizable monomer. The examples of the aromatic vinyl-containing monomer are styrene, α-methylstyrene, p-methylstyrene, etc. Styrene is the most preferable. The aromatic vinyl-containing monomer in the total copolymer resin is contained in the amount of 60 to 80 parts by weight. The examples of the other copolymerizable monomer are cyanide vinyl-containing compounds such as acrylonitrile and unsaturated nitrile-containing compounds such as methacrylonitrile. It is preferable that 40 to 20 parts by weight of the other copolymerizable monomer to the total copolymer is employed. In addition, 0 to 40 parts by weight of a monomer such as acrylic acid, methacrylic acid, maleic anhydride and N-substituted maleimide may be added and copolymerized thereto.

In the present invention, the rubber modified styrene-containing resin ($a_1$) comprises 20 to 100% by weight of a styrene-containing graft copolymer resin ($a_{11}$) and 0 to 80% by weight of a styrene-containing copolymer resin ($a_{12}$).

($a_2$) Polyphenylene ether resin

Polyphenylene ether resin is employed as a base resin to improve flame retardancy, heat resistance and rigidity of the resin composition according to the present invention. As examples of the polyphenylene ether resin, poly(2,6-dimethyl-1,4-phenylene) ether, poly(2,6-diethyl-1,4-phenylene) ether, poly(2,6-dipropyl-1,4-phenylene) ether, poly(2-methyl-6-ethyl-1,4-phenylene) ether, poly(2-methyl-6-propyl-1,4-phenylene) ether, poly(2-ethyl-6-propyl-1,4-phenylene) ether, poly(2,6-diphenyl-1,4-phenylene) ether, copolymer of poly(2,6-dimethyl-1,4-phenylene) ether and poly(2,3,6-trimethyl-1,4-phenylene) ether, and copolymer of poly(2,6-dimethyl-1,4-phenylene) ether and poly(2,3,5-triethyl-1,4-phenylene) ether can be used. Preferably, copolymer of poly(2,6-dimethyl-1,4-phenylene) ether and poly(2,3,6-trimethyl-1,4-phenylene) ether, and poly(2,6-dimethyl-1,4-phenylene) ether are preferably used, more preferably poly(2,6-dimethyl-1,4-phenylene) ether is used. The degree of polymerization of polyphenylene ether is not defined specifically, but considering heat-stability or processability of the resin composition, it is preferable that the viscosity of polypheylene ether is in the range of 0.2 to 0.8 measured in chloroform solvent at 25° C.

(B) Styrene-acrylonitrile copolymer having from 5 to 18% by weight of acrylonitrile, preferably from 8 to 15%

A styrene-acrylonitrile copolymer is added to the base resin to improve compatibility between the rubber modified styrene-containing resin ($a_1$) and the polyphenylene ether resin ($a_2$). The compatibility of both resins ($a_1$) and ($a_2$) depends on the content of acrylonitrile. For example, if the content of acrylonitrile is over 18% by weight, the resin composition shows reduction in mechanical properties due to low compatibility. In the present invention, the styrene-acrylonitrile copolymer consists of 82 to 95% by weight of styrene and 5 to 18% by weight of acrylonitrile. Other monomers may be employed for copolymerization with styrene-acrylonitrile. The examples of the other monomers are metacrylic acid, phenyl maleimide, etc. To advance heat resistance, α-substituted-styrene may be used instead of styrene.

The method for polymerization of the copolymer above may optionally be selected from emulsion polymerization, suspension polymerization, and bulk polymerization in accordance with conventional techniques. It is preferable that the weight average molecular weight of the copolymer is in the range of from 50,000 to 300,000.

In the present invention, the amount of a styrene-acrylonitrile copolymer used as compatibilizer is preferably 2 to 40 parts by weight per 100 parts by weight of the base resin.

(C) Aromatic phosphoric acid ester compound

The aromatic phosphoric acid ester compound used in the present invention is a compound having the following structural formula (I):

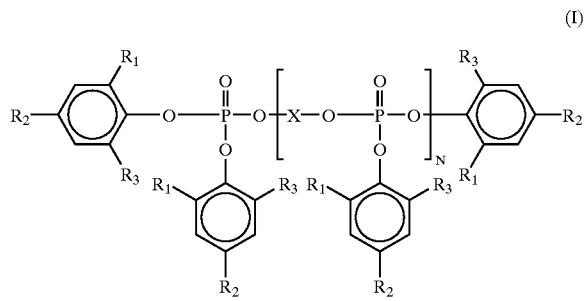

(I)

wherein $R_1$, $R_2$ and $R_3$ independently of one another are hydrogen or $C_1$–$C_4$ alkyl, X is a dialcohol derivative such as resorcinol, diphenol, hydroquinol, bisphenol-A and bisphenol-S, and N is 0–4.

In the structural formula (I), where N is 0, the compound include tri(2,6-dimethyl phenyl) phosphate, tri(2,4,6-trimethyl phenyl) phosphate, tri(2,4-ditertiary butyl phenyl) phosphate, tri(2,6-ditertiary butyl phenyl) phosphate, and the like, and where N is 1, the compound include resorcinol bis(2,6-dimethyl phenyl) phosphate, resorcinol bis(2,4-ditertiary butyl phenyl) phosphate, hydroquinone (2,6-dimethyl phenyl) phosphate, hydroquinone(2,4-ditertiary butyl phenyl) phosphate, and the like.

In addition, a phosphoric acid ester compound having a structure of phloroglucinol can be used in this invention. The phosphoric acid ester compound is represented as follow:

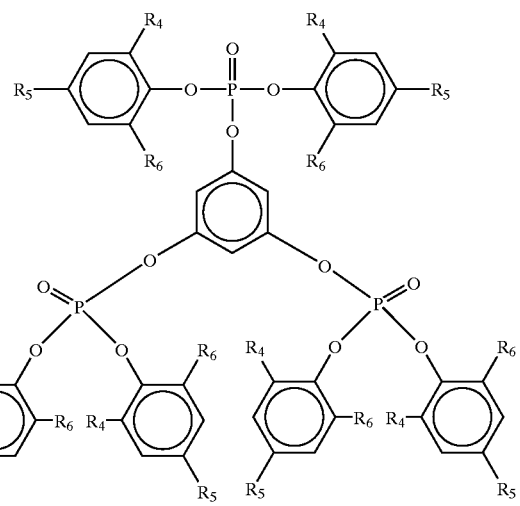

(II)

wherein $R_4$, $R_5$ and $R_6$ independently of one another are hydrogen or $C_1$–$C_4$ alkyl.

Examples of the phosphoric acid ester compound having the structural formula (II) include 1,3,5-tri(diphenyl phosphate) fluoroglucinol, 1,3,5-tri(dicresyl phosphate) fluoroglucinol, 1,3,5-tri(dixylenyl phosphate) fluoroglucinol, and the like. One of the phosphoric acid compounds or a mixture thereof can be employed in this invention. However, it is preferable that the compound or mixture has a molecular weight of less than 1,500, because the compound having a molecular weight of more than 1,500 does not provide the resin with a good flame-retardancy. Also, it is preferable that the phosphoric acid ester compound has a melting point of more than 90° C. However, in certain applications of the resin composition, the phosphoric acid ester compound having a melting point of less than 90° C. can be added in a small amount. For example, a small amount of the phosphoric acid ester compound may be added if the heat resistance drop due to the addition is acceptable.

In the present invention, the aromatic phosphoric acid ester compound as a flame retardant is used in the amount of from 5 to 30 parts by weight per 100 parts by weight of the base resin.

(D) Phenolic resin

A phenolic resin is added to the base resin as a further agent to improve flame-retardant property. The phenolic resin generates char on the surface of resin having three dimensional carbon chains under combustion, and the char prevents oxygen from entering into the combusting article from outside and combustion gas from expanding to outside.

Phenolic resins are classified in novolacs and resols, both of them may be employed in the present invention. The phenolic resins are also classified in thermosetting and thermoplastic resins, which may be used in the present invention.

Novolacs are more preferable than resols in this invention. Representative examples of the novolac phenolic resins are phenol-formaldehyde novolac resin, tertiary butylphenol formaldehyde novolac resin, paraoctylphenol formaldehyde novolac resin, paracyanophenol formaldehyde novolac resin and the like. One of the novolac phenolic resins or a copolymer of at least two of the resins can be used. The preferable average molecular weight of the novolac phenolic resins is in the range of from 300 to 10,000.

The phenolic resin is applied in the amount of 3 to 30 parts by weight on the basis of 100 parts by weight of the base resin. If the phenolic resin is employed less than 3 parts by weight, the resin composition shows poor flame retardancy. On the other hand, if the phenolic resin is used more than 30 parts by weight, the resin composition causes a decrease of mechanical or thermal properties.

Other additives may be contained in the resin composition of the present invention. The additives include an anti-dripping agent, an impact modifier, plasticizer, a heat stabilizer, an oxidation inhibitor, a light stabilizer, a compatibilizer and the like. An inorganic filler such as talc, silica, mica, glass fiber, an organic or inorganic pigment and/or dye can be added too. The additives are employed in the amount of 0 to 30 parts by weight on the basis of 100 parts by weight of the base resin.

The resin composition according to the present invention prevents toxic gases from generating during the preparation process and from expanding during combustion, thereby showing good flame retardancy, mechanical properties and heat resistance. These advantages of the flameproof resin composition are achieved by employing a styrene-acrylonitrile copolymer having 5 to 18% by weight of acrylonitrile, a phosphoric acid ester compound having a melting point of above 90° C. and a phenolic resin in the base resin consisting of a rubber modified styrene-containing resin and a polyphenylene ether resin.

The invention may be better understood by reference to the following examples which are intended for the purpose of illustration and are not to be construed as in any way limiting the scope of the present invention, which is defined in the claims appended hereto. In the following examples, all parts and percentage are by weight unless otherwise indicated.

EXAMPLES

The components to prepare flameproof thermoplastic resin compositions in Example 1~2 and Comparative Examples 1~8 are as follows:
(A) Base Resin
($a_1$) Rubber modified styrene-containing resin
($a_{11}$) Styrene-containing graft copolymer resin (ABS)

50 parts of butadiene rubber latex powder, 36 parts of styrene, 14 parts of acrylonitrile and 150 parts of deionized water were blended. To the blend, 1.0 parts of potassium oleate, 0.4 parts of cumenhydroperoxide, 0.2 parts of mercaptan-containing chain transfer agent, 0.4 parts of glucose, 0.01 parts of ferrous sulfate hydrate, and 0.3 parts of sodium pyrophosphate were added. The blend was kept at 75° C. for 5 hours to obtain ABS latex. To the ABS latex, 0.4 parts of sulfuric acid was added, coagulated and dried to obtain styrene-containing graft copolymer resin (g-ABS) in a powder form.
($a_{12}$) Styrene-containing copolymer resin (SAN with 25% by weight of AN)

75 parts of styrene, 25 parts of acrylonitrile, 120 parts of deionized water and 0.2 parts of azobisisobutylonitrile were blended. To the blend, 0.4 parts of tricalciumphosphate and 0.2 parts of mercaptan-containing chain transfer agent were added. The resultant solution was heated to 80° C. for 90 minutes and kept for 180 minutes. The resultant was washed, dehydrated and dried. Styrene-acrylonitrile copolymer (SAN) having a weight average molecular weight of 160,000 to 200,000 was obtained.
($a_2$) Polyphenylene ether resin Poly(2,6-dimethyl-1,4-phenyl) ether of Japan Asai Kasei Co. was used, and the product name of powder form was P-402.
(B) Styrene-acrylonitrile copolymer Two different copolymers ($b_1$ and $b_2$) used in the Examples were synthesized as follows:
($b_1$) Styrene-containing copolymer resin (SAN with 13% by weight of AN)

87 parts of styrene, 13 parts of acrylonitrile, 120 parts of deionized water, 0.1 parts of azobisisobutylonitrile, 0.2 parts of 1,1'-di(tertiarybutylperoxy)-3,3',5-trimethylcyclohexane, 0.4 parts of tricalcium phosphate and 0.2 parts of mercaptan-containing chain transfer agent were blended. The blended solution was heated up to 80° C. for 90 minutes and was kept it for 150 minutes. The solution was heated up to 95° C. again and kept for 120 minutes. The resultant was washed, dehydrated and dried. Styrene-acrylonitrile copolymer (SAN) having a weight average molecular weight from 100,000 to 140,000 and 13% of acrylonitrile content was obtained.
($b_2$) Styrene-containing copolymer resin (SAN with 20% by weight of AN)

Copolymer resin (SAN) having 20% of AN content was prepared in the same manner as in ($b_1$) except that the amounts of styrene and acrylonitrile were used to 80 and 20 parts, respectively. The weight average molecular weight of the styrene-acrylonitrile copolymer is in the range of from 100,000 to 160,000.
(C) Aromatic phosphoric acid ester compound Four different compounds ($c_1$, $c_2$, $c_3$ and $c_4$) were used as follows:

($c_1$) Tri(2,6-dimethylphenyl) phosphate with a melting point of 137° C.;

($c_2$) Resocinol bis(2,6-dimethylphenyl) phosphate with a melting point of 97° C.;

($c_3$) Triphenylphosphate(TPP) with a melting point of 48° C.; and ($c_4$) Resorcinol diphenyl phosphate oligomer(RDP) which is liquid phase at room temperature.
(D) Phenolic Resin Novolac phenolic resin of PSM 4324 Grade of Japan Gunei Co. was used herein.

The components to prepare flameproof thermoplastic resin compositions in Examples 1~2 and Comparative Examples 1~8 are shown in Table 1.

TABLE 1

|  | Examples | | Comparative Examples | | | | | | | |
|---|---|---|---|---|---|---|---|---|---|---|
|  | 1 | 2 | 1 | 2 | 3 | 4 | 5 | 6 | 7 | 8 |
| Graft copolymer resin($a_1$) | 80 | 80 | 80 | 80 | 80 | 80 | 80 | 80 | 100 | 80 |
| Polyphenylene ether($a_2$) | 20 | 20 | 20 | 20 | 20 | 20 | 20 | 20 | — | 20 |
| SAN(AN: 13 wt. %)($b_1$) | 10 | 10 | 10 | 10 | — | — | — | 10 | 10 | — |
| SAN(AN: 20 wt. %)($b_2$) | — | — | — | — | — | — | — | — | — | 10 |

TABLE 1-continued

|  | Examples | | Comparative Examples | | | | | | | |
|---|---|---|---|---|---|---|---|---|---|---|
|  | 1 | 2 | 1 | 2 | 3 | 4 | 5 | 6 | 7 | 8 |
| Tri (2,6-dimethylphenyl) phosphate($c_1$) | 16 | 10 | — | — | 16 | — | — | 16 | 16 | 16 |
| Resosinol bis(2,6-dimethyl phenyl) phosphate($c_2$) | — | 6 | — | — | — | — | — | — | — | — |
| Triphenyl phosphate($c_3$) | — | — | 16 | — | — | 16 | — | — | — | — |
| Resorcinolphenyl phosphate oligomer($c_4$) | — | — | — | 16 | — | — | 16 | — | — | — |
| Phenolic resin(D) | 6 | 6 | 6 | 6 | 6 | 6 | 6 | — | 6 | 6 |

In the Examples and Comparative Examples, the components were blended and extruded in the form of pellets with a twin-screw extruder at 200~280° C. The pellets were dried at 80° C. for 3 hours and extruded into test specimens in a 6 oz. extruder at molding temperature of 220~280° C. and barrel temperature of 40~80° C., and the resin pellets were molded into test specimens. Impact strengths of the test specimens of Example and Comparative Examples were measured according to Izod impact strength ASTM D-256 (⅛" notch), Vicat softening temperatures were measured according to ASTM D-1525 under 5 kg and flame retardancy (1/10") was measured according to UL94 VB. The test results are presented in Table 2.

TABLE 2

|  | Examples | | Comparative Examples | | | | | | | |
|---|---|---|---|---|---|---|---|---|---|---|
|  | 1 | 2 | 1 | 2 | 3 | 4 | 5 | 6 | 7 | 8 |
| Impact strength(1/8") (kg · cm/cm) | 18 | 16 | 14 | 10 | 3 | 4 | 3 | 22 | 17 | 5 |
| Vicat softening temp. | 87 | 86 | 76 | 79 | 88 | 76 | 80 | 89 | 82 | 87 |
| UL 94(1/10") | V-1 | V-1 | V-1 | V-1 | V-1 | V-1 | V-1 | Fail | Fail | V-1 |

As shown in Examples 1~2 and Comparative Examples 1 and 2, the phosphoric acid ester compound with a melting point of above 90° C. was not used in the resin composition of Comparative Examples 1 and 2. The Comparative Examples show lower impact strengths and heat resistances than Examples 1~2. Comparative Examples 3~5 not employing styrene-acrylonitrile copolymer show much lower impact strengths than Example 1 due to degradation of compatibility. Further, in Comparative Example 8 using the styrene-acrylonitrile copolymer with 20% by weight of acrylonitrile, the flame retardancy and heat resistance were enhanced, but the impact strength was very low. In Comparative Example 6 excluding the phenolic resin, the impact strength and heat resistance were improved but flame retardancy was not shown, and in Comparative Example 7 excluding polyphenylene ether resin, the flame retardancy and heat resistance were deteriorated.

As described above, in order to obtain resin compositions having good impact strength, heat resistance and flame retardancy, a styrene-acrylonitrile copolymer containing 5 to 18% by weight of acrylonitrile, a phosphoric acid ester compound with a melting point of above 90° C. and a phenolic resin should be added to the base resin consisting of a rubber modified styrene-containing resin and a polyphenylene ether resin.

The present invention can be easily carried out by an ordinary skilled person in the art. Many modifications and changes may be deemed to be with the scope of the present invention as defined in the following claims.

What is claimed is:

1. A flameproof thermoplastic resin composition comprising:
   (A) 100 parts by weight of a base resin comprising ($a_1$) 40 to 95% by weight of a rubber modified styrene-containing resin and ($a_2$) 60 to 5% by weight of a polyphenylene ether resin,
   (B) 2 to 40 parts by weight of a styrene-acrylonitrile copolymer having 5 to 18% by weight of acrylonitrile content;
   (C) 5 to 30 parts by weight of an aromatic phosphoric acid ester compound having
      1) a melting point of above 90° C. and
      2) the following formula (I):

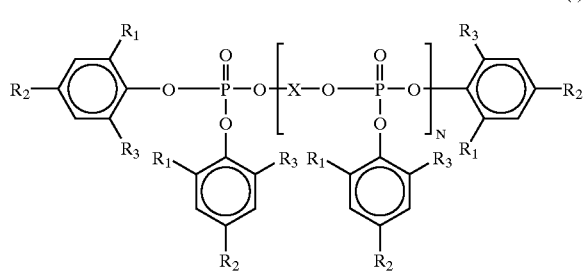

wherein $R_1$, $R_2$, and $R_3$ are hydrogen or $C_1$–$C_4$ alkyl, wherein at least one of $R_1$, $R_2$, and $R_3$ is $C_1$–$C_4$ alkyl, X is a dialcohol derivative selected from the group consisting of resorcinol, diphenol, hydroquinol, bisphenol-A and bisphenol-S, and the value of n is 0 or 1, and
   (D) 3 to 30 parts by weight of a phenolic resin
   wherein the amounts of (B), (C), and (D) are per 100 parts by weight of the base resin.

2. The flameproof thermoplastic resin composition as defined in claim 1 wherein $R_1$, $R_2$, and $R_3$ in formula (I) are $C_1$–$C_4$ alkyl.

3. The flameproof thermoplastic resin composition as defined in claim 1 wherein $R_1$ and $R_3$ in formula (I) are $C_1$–$C_4$ alkyl.

4. The flameproof thermoplastic resin composition as defined in claim 1 wherein said rubber modified styrene-containing resin ($a_1$) comprises 20 to 100% by weight of a styrene-containing graft copolymer resin and 80 to 0% by weight of a styrene-containing copolymer resin.

5. The flameproof thermoplastic resin composition as defined in claim 4 wherein said styrene-containing copolymer resin includes 20 to 40% by weight of acrylonitrile content.

6. The flameproof thermoplastic resin composition as defined in claim 1 wherein said phenolic resin (D) is a novolac.

7. The flameproof thermoplastic resin composition as defined in claim 6 wherein said novolac phenolic resin is selected from the group consisting of phenol-formaldehyde novolac resin, tertiarybutylphenol formaldehyde novolac resin, paraoctylphenol formaldehyde novolac resin, paracyanophenol formaldehyde novolac resin and a copolymer thereof.

8. The flameproof thermoplastic resin composition as defined in claim 1 wherein said base resin comprises ($a_1$) 60 to 95% by weight of a rubber modified styrene-containing resin and ($a_2$) 40 to 5% by weight of a polyphenylene ether resin.

9. The flameproof thermoplastic resin composition as defined in claim 1 wherein said base resin comprises of ($a_1$) 70 to 95% by weight of a rubber modified styrene-containing resin and ($a_2$) 30 to 5% by weight of a polyphenylene ether resin.

10. The flameproof thermoplastic resin composition as defined in claim 1 wherein said styrene-acrylonitrile copolymer (B) has 8 to 15% by weight of acrylonitrile content.

11. A flameproof thermoplastic resin composition comprising:

(A) 100 parts by weight of a base resin comprising ($a_1$) 40 to 95% by weight of a rubber modified styrene-containing resin and ($a_2$) 60 to 5% by weight of a polyphenylene ether resin, (B) 2 to 40 parts by weight of a styrene-acrylonitrile copolymer having 5 to 18% by weight of acrylonitrile content;

(C) 5 to 30 parts by weight of an aromatic phosphoric acid ester compound selected from the group consisting of tri(2,6-dimethyl phenyl) phosphate, tri (2,4,6-trimethyl phenyl) phosphate, tri(2,4-ditertiary butyl phenyl) phosphate, tri(2,6-ditertiary butyl phenyl) phosphate, resorcinol bis (2,6-dimethyl phenyl) phosphate, resorcinol bis (2,4-ditertiary butyl phenyl) phosphate, hydroquinone (2,6-dimethyl phenyl) phosphate, and hydroquinone(2,4-ditertiary butyl phenyl) phosphate;

(D) 3 to 30 parts by weight of a phenolic resin
wherein the amounts of (B), (C), and (D) are per 100 parts by weight of the base resin.

12. The flameproof thermoplastic resin composition as defined in claim 11 wherein said rubber modified styrene-containing resin ($a_1$) comprises 20 to 100% by weight of a styrene-containing graft copolymer resin and 80 to 0% by weight of a styrene-containing copolymer resin.

13. The flameproof thermoplastic resin composition as defined in claim 12 wherein said styrene-containing copolymer resin includes 20 to 40% by weight of acrylonitrile content.

14. The flameproof thermoplastic resin composition as defined in claim 11 wherein said phenolic resin (D) is a novolac.

15. The flameproof thermoplastic resin composition as defined in claim 14 wherein said novolac phenolic resin is selected from the group consisting of phenol-formaldehyde novolac resin, tertiarybutylphenol formaldehyde novolac resin, paraoctylphenol formaldehyde novolac resin, paracyanophenol formaldehyde novolac resin and a copolymer thereof.

16. The flameproof thermoplastic resin composition as defined in claim 11 wherein said base resin comprises ($a_1$) 60 to 95% by weight of a rubber modified styrene-containing resin and ($a_2$) 40 to 5% by weight of a polyphenylene ether resin.

17. The flameproof thermoplastic resin composition as defined in claim 11 wherein said base resin comprises of ($a_1$) 70 to 95% by weight of a rubber modified styrene-containing resin and ($a_2$) 30 to 5% by weight of a polyphenylene ether resin.

18. The flameproof thermoplastic resin composition as defined in claim 11 wherein said styrene-acrylonitrile copolymer (B) has 8 to 15% by weight of acrylonitrile content.

19. A flameproof thermoplastic resin composition comprising:

(A) 100 parts by weight of a base resin comprising ($a_1$) 40 to 95% by weight of a rubber modified styrene-containing resin and ($a_2$) 60 to 5% by weight of a polyphenylene ether resin, (B) 2 to 40 parts by weight of a styrene-acrylonitrile copolymer having 5 to 18% by weight of acrylonitrile content;

(C) 5 to 30 parts by weight of an aromatic phosphoric acid ester compound selected from the group consisting of tri(2,6-dimethyl phenyl) phosphate, resorcinol bis (2,6-dimethyl phenyl) phosphate, resorcinol bis (2,4-ditertiary butyl phenyl) phosphate, and hydroquinone (2,6-dimethyl phenyl) phosphate, (D) 3 to 30 parts by weight of a phenolic resin
wherein the amounts of (B), (C), and (D) are per 100 parts by weight of the base resin.

20. The flameproof thermoplastic resin composition as defined in claim 19 wherein said rubber modified styrene-containing resin ($a_1$) comprises 20 to 100% by weight of a styrene-containing graft copolymer resin and 80 to 0% by weight of a styrene-containing copolymer resin.

21. The flameproof thermoplastic resin composition as defined in claim 20 wherein said styrene-containing copolymer resin includes 20 to 40% by weight of acrylonitrile content.

22. The flameproof thermoplastic resin composition as defined in claim 19 wherein said phenolic resin (D) is a novolac.

23. The flameproof thermoplastic resin composition as defined in claim 22 wherein said novolac phenolic resin is selected from the group consisting of phenol-formaldehyde novolac resin, tertiarybutylphenol formaldehyde novolac resin, paraoctylphenol formaldehyde novolac resin, paracyanophenol formaldehyde novolac resin and a copolymer thereof.

24. The flameproof thermoplastic resin composition as defined in claim 19 wherein said base resin comprises ($a_1$) 60 to 95% by weight of a rubber modified styrene-containing resin and ($a_2$) 40 to 5% by weight of a polyphenylene ether resin.

25. The flameproof thermoplastic resin composition as defined in claim 19 wherein said base resin comprises of ($a_1$) 70 to 95% by weight of a rubber modified styrene-containing resin and ($a_2$) 30 to 5% by weight of a polyphenylene ether resin.

26. The flameproof thermoplastic resin composition as defined in claim 19 wherein said styrene-acrylonitrile copolymer (B) has 8 to 15% by weight of acrylonitrile content.

* * * * *